J. D. YODER.
WATER SOFTENING APPARATUS.
APPLICATION FILED APR. 27, 1920.
1,425,621.
Patented Aug. 15, 1922.
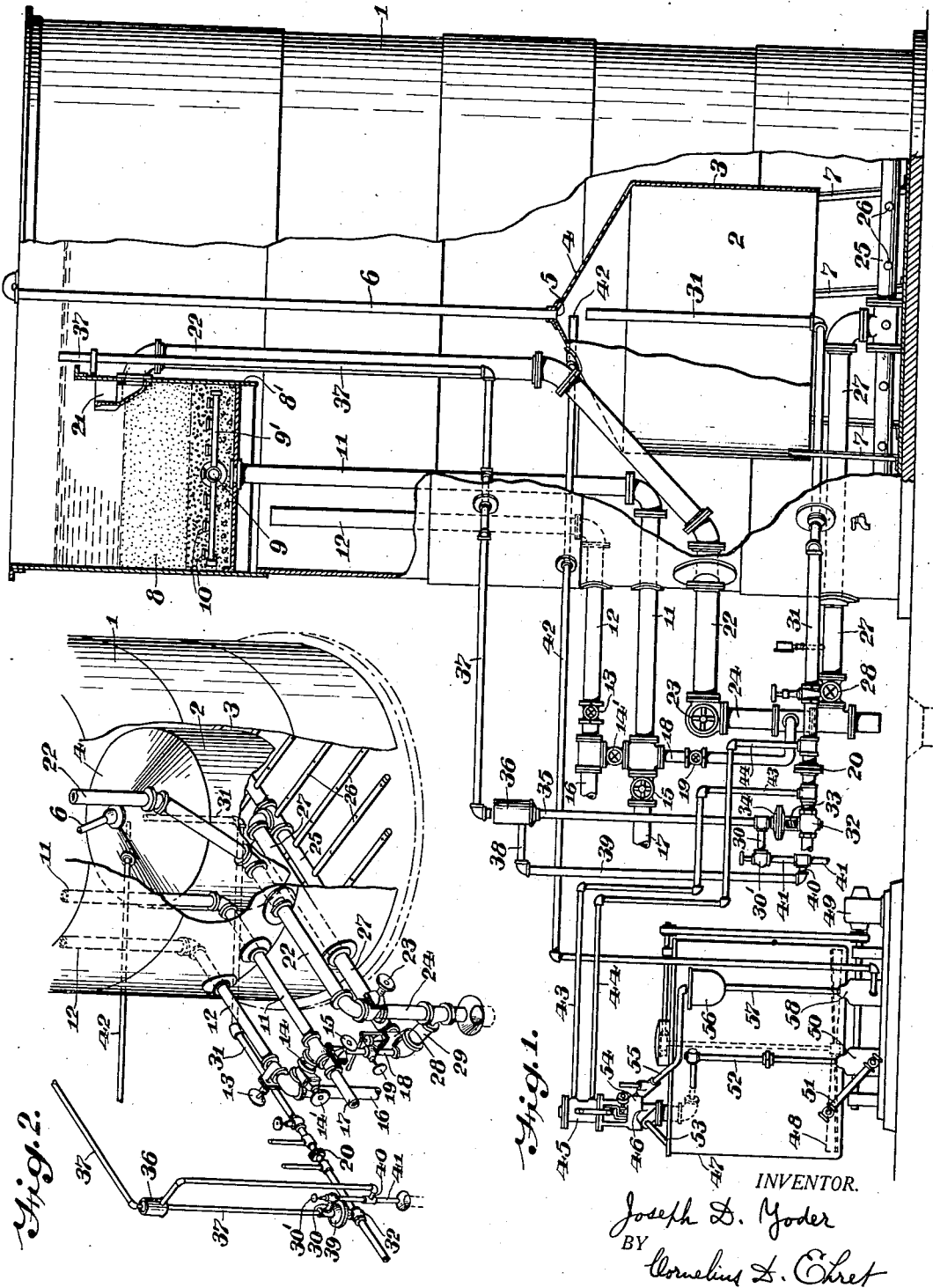
INVENTOR.
Joseph D. Yoder
BY
Cornelius D. Ehret
his ATTORNEY.

UNITED STATES PATENT OFFICE.

JOSEPH D. YODER, OF PHILADELPHIA, PENNSYLVANIA, ASSIGNOR TO H. S. B. W.-COCHRANE CORPORATION, OF PHILADELPHIA, PENNSYLVANIA, A CORPORATION OF PENNSYLVANIA.

WATER-SOFTENING APPARATUS.

1,425,621.  Specification of Letters Patent.  Patented Aug. 15, 1922.

Application filed April 27, 1920. Serial No. 376,956.

*To all whom it may concern:*

Be it known that I, JOSEPH D. YODER, a citizen of the United States, residing in the city and county of Philadelphia, State of Pennsylvania, have invented certain new and useful Improvements in Water-Softening Apparatus, of which the following is a specification.

My invention relates to apparatus for treating water, particularly while cold, and relates more particularly to apparatus for softening water, for instance, for softening water for use in steam boilers.

My apparatus includes a treating tank in which the water and water softening agent are mixed and the solid reaction products are separated and the softened water is stored, means for supplying raw water to the treating tank, automatic means for controlling the supply of raw water, a reagent supply tank, means for supplying reagent from the reagent supply tank to the treating tank, and means for varying the supply of reagent with variations in the supply of raw water.

An object of my invention is to provide water softening apparatus in which the various instrumentalities employed, such as the water supply and control apparatus, the reagent supply and control apparatus, and the conduits and valves, are located near the ground and in close proximity to each other, where they are readily protected against freezing and are easily accessible for manipulation and repair, and my invention resides in apparatus which accomplishes this object.

My invention resides further in apparatus of the character referred to, wherein raw water to be softened and softening reagent are introduced in streams impinging against each other within a mixing chamber, whereby a rapid and thorough admixture of the water and reagent within the mixing chamber is produced.

My invention resides further in a water treating tank provided with a reaction chamber formed and positioned to assist the separation of solid reaction products from the water passing from the reaction chamber into the body portion of the treating tank.

My invention resides further in a treating tank provided with a mixing chamber at or near the bottom, and a filter at or near the top, whereby the chemically treated water passes upwardly from the mixing chamber to the filter and a large proportion of solid reaction products and impurities are separated by sedimentation.

My invention resides further in the combination of instrumentalities which go to make up the water treating apparatus above referred to.

My invention resides in features of structure and combination hereinafter described.

For an illustration of one of the forms my invention may take, reference is to be had to the accompanying drawings, in which:

Fig. 1 is an elevation, partly in section, of the complete water treating apparatus.

Fig. 2 is a perspective view of the water treating apparatus with the reagent tank and control means omitted.

Referring to the drawing, the treating tank 1 is a cylindrical flat bottom tank of ordinary construction and any desired capacity. Within the treating tank near the bottom thereof is a mixing chamber 2 open at the bottom and having cylindrical side walls 3 and conical top wall 4. The mixing chamber is supported with wall 3 spaced from the bottom of treating tank 1, on legs 7. At the vertex of conical top 4 is an opening 5, to which is connected an air vent pipe 6, leading to the top of treating tank 1.

While I have shown and described the mixing chamber as having a conical top, my invention is not limited thereto. Other forms of mixing chamber, for example, a mixing chamber with a flat top or a flat top provided with a dome, may be employed.

Adjacent the top of the treating tank 1 is a filter 8, of any suitable construction. As shown, the filter comprises a receptacle formed by a wall of treating tank 1 and a transverse wall 8' provided with the usual filter bed of sand, gravel, etc. Projecting into the bottom of the filter 8 is a pipe 11, upon the upper end of which is the filter head 9 carrying filter laterals 9', in which are the usual protected openings 10.

The pipe 11 extends downwardly and outwardly through the wall of treating tank 1 adjacent the bottom thereof. A pipe 12 having its open upper end positioned a short distance below the bottom of filter 8 also extends downwardly within the treating tank 1 and outwardly through the wall thereof. The pipe 12 is controlled by a valve 13 and is connected through pipe 14 controlled by valve 14' with pipe 11. Beyond the junction of pipe 14 with pipe 11, the latter is controlled by a valve 15.

Fastened to the wall 8' of filter 8 near the top edge thereof is the wash water trough 21, communicating with wash water drain pipe 22 which extends downwardly and outwardly through the wall of tank 1. Pipe 22 is controlled by valve 23 and connects with pipe 24 leading to a sewer connection.

Near the bottom of tank 1 is the sludge manifold 25 communicating with sludge laterals 26 provided with a large number of openings or perforations 20. Sludge manifold 25 communicates with sludge pipe 27 controlled by a quick opening valve 28. Pipe 27 is connected by pipe 29 with pipe 24 leading to the sewer connection.

The pipe 11, at a point intermediate valve 15 and tank 1, communicates through pipe 18 controlled by a valve 19 with pipe 29 and at a point beyond valve 15 communicates with a wash water supply pipe 17. The pipe 12 beyond valve 13 communicates with pipe 16 for the delivery of softened or softened and filtered water to any desired point, for instance, to a steam boiler or to the feed water heater of a steam boiler.

Raw water supply pipe 31 leads from any suitable source of supply into tank 1 and extends upwardly therein into reaction chamber 2 to a point adjacent the vertex of the top 4 of the mixing chamber.

Reagent supply pipe 42 leads from the reagent supply means hereinafter described and delivers into the top of mixing chamber at a point adjacent the delivery end of raw water supply pipe 31.

My invention is not limited to this particular arrangement of the water and reagent supply pipes 31 and 42. The essential feature is that reagent and water be supplied to the interior of the mixing chamber, and this may be accomplished by means of a water supply pipe and a reagent supply pipe entering the mixing chamber at any point and in extending in any direction desired. An arrangement such as that shown is, however, preferred, in which the reagent and water are delivered into the mixing chamber adjacent its closed end, the supply pipes terminating in close proximity and preferably delivering impinging streams of water and reagent. Or I may deliver the reagent and water into the same conduit outside of the treating tank and introduce them together through said conduit into the mixing chamber.

The operation of the apparatus thus far described is as follows:

Streams of raw water supplied through pipe 31 and softening reagent supplied through pipe 42 impinge and thoroughly mix in the region adjacent the top of mixing chamber 2. Any air or other gases carried in the water or reagent rises to the vertex of cover 4 passing through opening 5 and pipe 6 to the atmosphere. The water mixed with reagent flows downwardly within the mixing chamber 2 beneath the lower edge of wall 3, and upwardly between the wall 3 and the wall of tank 1 to the clear and unobstructed upper part of tank 1. The larger suspended particles of impurities and precipitate produced by the action of the softening agent separate out of the water as it passes under the edge of wall 3 and settle to the bottom of tank 1. The larger particles of precipitate thus separating carry with them some of the smaller particles of precipitate and impurities. Some sedimentation also occurs as the water passes slowly upwardly in tank 1 toward the filters.

Sludge in the bottom of tank 1 is removed by quickly opening valve 28, whereby water in the bottom of the tank flows with a rush through laterals 26, manifold 25, pipes 27 and 29 to the sewer, carrying with it the sludge and suspended matter on the bottom of tank 1.

Water rises in tank 1 to the level of the top of pipe 37, and is maintained at this level by means hereinafter described, and flows over the edge of wall 8' into filter 8 passing through the filter bed, openings 10, laterals 9', manifold 9, pipe 11, pipe 14, valve 14' and pipe 16, from which it is delivered as softened and filtered water. Softened water which has not been filtered or passed through filter 8 may be withdrawn from the upper end of tank 1 through pipe 12, valve 13 and pipe 16.

For washing the filter, water is forced under pressure through pipe 17, valve 15, pipe 11, manifold 9, laterals 9', and openings 10, agitating and washing the filter bed and discharging through wash water trough 21, pipe 22, valve 23, and pipe 24, to the sewer. Wash water may also, if desired, or necessary, be forced through pipe 17, valve 15, pipe 18, valve 19, valve 28, pipe 27, manifold 25, and laterals 26 into the bottom of tank 1 for the purpose of stirring up the deposit of sludge, which is then drawn off to the sewer as above described.

Immediately after washing the filter, the operation thereof is not efficient, and water passing therethrough is not clear and may be delivered through pipe 11, pipe 18, valve 19, and pipe 29, to pipe 24, and thence to the sewer.

In the operation of apparatus as above described, it is desirable automatically to control the height of liquid in tank 1 and to vary the supply of softening reagent supplied to mixing chamber 2 as the supply of raw water is varied.

For controlling the supply of raw water to maintain a predetermined level of water in tank 1, I have illustrated a socalled "altitude valve", it being understood, however, for filtered water passing downwardly in said tank and extending to the exterior thereof adjacent the bottom of said tank, and valve controls for said conduit external to said tank adjacent the bottom thereof for drawing filtered water from said conduit or for introducing filter wash water in reverse direction through said conduit.

2. Water treating apparatus comprising a treating tank, pipes delivering water to be treated and reagent into said tank adjacent the bottom thereof, a filter adjacent the top of said tank to which the treated water flows upwardly through said tank, a conduit for filtered water passing downwardly in said tank and extending to the exterior thereof adjacent the bottom of said tank, a second conduit for withdrawing unfiltered water from adjacent the top of said tank and passing downwardly in said tank and extending to the exterior adjacent the bottom thereof, and a valved connection between said conduits external to said tank.

3. Water treating apparatus comprising a treating tank, pipes delivering water to be treated and reagent into said tank adjacent the bottom thereof, a filter adjacent the top of said tank to which the treated water flows upwardly through said tank, conduits for withdrawing, respectively, filtered and unfiltered water from adjacent the top of said tank, said conduits passing downwardly within said tank and to the exterior adjacent the bottom thereof, a supply pipe for treated water, and valves controlling communication between said conduits and said supply pipe.

4. Water softening apparatus comprising a treating tank, a mixing chamber comprising a portion of said treating tank, means for introducing raw water and softening reagent into said mixing chamber, automatic means controlling the supply of water to maintain a constant level in said treating tank, means for varying the supply of reagent with variations in the supply of raw water, a filter receiving treated water discharged upwardly through said tank around the lower edges of said chamber, a conduit communicating with the discharge side of said filter extending downwardly in said tank and to the exterior adjacent the bottom thereof, a treated water supply pipe, means for connecting said conduit to said supply pipe, means for introducing filter wash water in reverse direction through said conduit, and a conduit receiving the wash water after action upon the filter passing downwardly through said tank and to the exterior adjacent the bottom thereof.

5. Water treating apparatus comprising a treating tank, a mixing chamber having a closed upper end situated wholly within the lower half of said treating tank, a filter adjacent the upper end of said treating tank, pipes entering the lower end of said treating tank and delivering raw water and reagent within said mixing chamber, and conduits connecting with said filter for removing, respectively, filtered water and filter wash water after action upon said filter, said conduits extending downwardly within said tank and to the exterior adjacent the bottom thereof.

6. Water softening apparatus comprising a treating tank, a mixing chamber in the lower portion of said treating tank, means for introducing raw water and softening reagent into said mixing chamber, automatic means controlling the supply of reagent, and automatic means controlling the supply of water comprising a valve, a standpipe controlling said valve, and a conduit communicating with said stand pipe and terminating within said treating tank at the desired water level.

7. Water softening apparatus comprising a treating tank, a mixing chamber adjacent one end of said tank, a filter adjacent the other end of said tank, conduits conducting raw water and softening reagent terminating adjacent each other in said mixing chamber and delivering streams impinging against each other, and means for withdrawing water from said treating tank adjacent said filter.

8. Water treating apparatus comprising a flat bottom treating tank, a mixing chamber within said treating tank having an opening adjacent the bottom of said treating tank, means for withdrawing sludge from said treating tank, said means comprising sludge conduits situated between said mixing chamber and the bottom of said treating tank, and pipes having their discharge orifices closely adjacent each other within the top of said mixing chamber, said pipes conducting, respectively, raw water and reagent.

9. Water treating apparatus comprising a treating tank, a mixing chamber within said treating tank, sludge removal conduits adjacent the bottom of said treating tank, a filter adjacent the upper end of said treating tank, a conduit for withdrawing water from the upper end of said treating tank through said filter, a second conduit for withdrawing treated unfiltered water from the upper end of said treating tank, and means for conducting independently into said mixing chamber raw water and reagent.

10. Water treating apparatus comprising a treating tank, a water conduit entering said tank, a reagent conduit entering said tank, said conduits terminating within said tank adjacent each other and adapted to supply streams of water and reagent impinging against each other.

11. Water treating apparatus comprising a treating tank, a mixing chamber closed at that my invention is not limited to this particular control means. Other means, such as the float valve illustrated in patent to Yoder 1,262,730, April 16, 1918, may be employed.

The altitude valve control which I employ comprises a pipe 37 having its open upper end positioned within tank 1 at the desired water level and extending downwardly and delivering into a funnel or reservoir 36. Funnel 36 delivers into a stand pipe 35, the lower end of which communicates with diaphragm chamber 39. The chamber 39 contains a flexible diaphragm connected with balanced valve 32 in pipe 31. A spring 33 is associated with valve 32 and normally tends to hold it in open position. The stand pipe 35 is by-passed by pipes 38, 39, 40, 41 and 30, forming a continuous conduit between funnel 36 and stand pipe 35 at a point adjacent the bottom thereof. Pipe 30 is controlled by valve 30' and connects with pipe 41, which extends downwardly beyond its point of connection with pipe 40, and is open at its lower end.

In operation valve 30' is cracked, so that water may pass from stand pipe 35, through pipes 30 and 41, to waste. If the water in tank 1 is not sufficiently high to overflow into pipe 37, valve 32 is held open by spring 33 and raw water is allowed to pass freely through pipe 31 to tank 1. If the level of water in tank 1 rises, it overflows the top of pipe 37, passing through pipe 37 into funnel 36 and pipe 35. A column of water is thus established in pipe 35 bearing upon diaphragm 39 and closing valve 32 to a degree depending upon the height of the column. A very slow flow of water from pipe 37 to pipe 35 will leak away through valve 30', and will not form a column in 35. If after a column of water has been established in pipe 35 the level in tank 1 recedes, and ceases to flow into pipe 37, the column in pipe 35 will leak away through valve 30' and allow valve 32 to open. Any excess of water flowing into pipe 35 beyond that necessary to maintain the column therein passes to waste through the by-pass formed by pipes 38, 39, 40 and 41.

For controlling the supply of softening reagent to tank 1, I employ the device shown in patent to Yoder 1,262,730, April 16, 1918. In the raw water supply pipe 31 I provide an orifice plate 20 through which water delivered through pipe 31 shall pass. The orifice in orifice plate 20 is sufficiently restricted to require an appreciable effective pressure or head for the delivery therethrough of the desired or required amount of water. There is therefore a difference in pressure on opposite sides of the plate 20 in pipe 31. Communicating with pipe 31 on opposite sides of plate 20 are pipes 43 and 44 leading, respectively, to the top and bottom of cylinder 45, within which is a piston operating through a piston rod to open and close valve 46.

The softening reagent is supplied to tank 70 47 and agitated therein by a suitable stirrer 48, driven by a motor 49 or other suitable means. Motor 49 also operates a pump 50, which withdraws liquid from the bottom of tank 47 through pipe 51 and delivers it through pipe 52, valve 46 and pipe 53 back into the tank 47. The valve 46 is so balanced as to remain open when unaffected by the piston in cylinder 45, whereby fluid freely circulates as above described. As the rate of flow of water through pipe 31 increases, the difference in pressure on opposite sides of orifice plate 20 increases, and this difference in pressure is transmitted through pipes 43 and 44 and operates the piston in cylinder 45 partially to close valve 46. Resistance is thereby offered to flow of liquid through valve 46, whereby some of said liquid is caused to overflow through by-pass 54, pipe 55, funnel 56 and pipe 57, from which it is forced by pump 58 through pipe 42 to reaction chamber 2.

From the above description in connection with the patent above referred to it will be understood that as the flow of water through pipe 31 under control of valve 32 increases or decreases, the supply of reagent furnished is increased or decreased correspondingly.

My apparatus in operation requires very little attention, is easily operated and repaired, and operates efficiently and continuously. The softening reagent and raw water are accurately proportioned through a wide range of operation.

An advantageous feature of my invention resides in the employment of a reaction chamber in which the softening reagent and water are quickly and thoroughly mixed due to the impact of streams thereof and react out of direct contact with the body of water in the treating tank and from which the water flows in reversed directions under the edge of the reaction chamber and upwardly in the treating tank, whereby a large proportion of the suspended impurities are separated by sedimentation, thus protecting the filter.

While I have described my invention as embodied in the specific form of apparatus illustrated, it is understood that the same is capable of modification within the scope of my invention as defined in the following claims.

What I claim is:

1. Water treating apparatus comprising a treating tank, pipes delivering water to be treated and reagent into said tank adjacent the bottom thereof, a filter adjacent the top of said tank to which the treated water flows upwardly through said tank, a conduit its top and open at its lower end comprising a top wall and side walls in the lower portion of said treating tank, said side walls extending downwardly and terminating adjacent the bottom of said treating tank, and conduits for independently delivering water and treating reagent extending into the said mixing chamber and terminating adjacent the top thereof.

12. Water treating apparatus comprising a treating tank, a mixing chamber adjacent the lower end of said treating tank, and a conduit connecting the top of said mixing chamber with the atmosphere at a level above the water in said treating tank.

13. Water treating apparatus comprising a treating tank, a mixing chamber in the lower end of said treating tank, said mixing chamber comprising an upwardly converging conical top wall and cylindrical side walls terminating adjacent the bottom of said treating tank, a water conduit extending upwardly and terminating adjacent the vertex of said conical top wall, and a reagent conduit extending horizontally and terminating adjacent the end of said water conduit.

14. Water treating apparatus comprising a treating tank having a flat bottom, a mixing chamber having a closed top and an open end adjacent said flat bottom, means for introducing streams of liquid into the upper end of said mixing chamber, said streams impinging against each other, a filter adjacent the upper end of said treating tank, and means for withdrawing liquid from the upper end of said treating tank through said filter.

15. Water treating apparatus comprising a vertically disposed cylindrical flat bottom treating tank, a mixing chamber comprising a top wall, side walls and an open bottom, said side walls terminating a short distance from the bottom of said treating tank, means for introducing impinging streams of water and softening reagent into the top of said mixing chamber, sludge removal conduits adjacent the bottom of said treating tank, and means for removing water from adjacent the top of said treating tank.

16. Water treating apparatus comprising a treating tank, a mixing chamber closed at its top and open at its bottom adjacent the bottom of said treating tank, a connection from the top of said mixing chamber to atmosphere, pipes terminating within said mixing chamber adjacent the top thereof and conducting thereto, respectively, water to be treated and reagent, a filter adjacent the top of said tank into which overflows treated water flowing from said chamber around the bottom thereof upwardly in said tank, and means for withdrawing filtered water from said filter.

17. Water treating apparatus comprising a treating tank, a raw water supply therefor, an altitude valve controlling the supply of raw water to said tank, a differential pressure producing device between said valve and said tank producing a pressure difference dependent upon the amount of raw water delivered into said tank, means controlled by said differential pressure device controlling delivery of reagent into said tank, a treating chamber closed at its top and open at its bottom adjacent the bottom of said treating tank, said reagent and raw water meeting in said chamber, and a filter adjacent the top of said tank into which overflows treated water flowing from said chamber around the bottom thereof and upwardly through said tank.

In testimony whereof I have hereunto affixed my signature this 20th day of April, 1920.

JOSEPH D. YODER.